United States Patent [19]

Gabas

[11] Patent Number: 5,180,202
[45] Date of Patent: Jan. 19, 1993

[54] SUN VISOR FOR AUTOMOBILES

[75] Inventor: Carlos Gabas, Barcelona, Spain

[73] Assignee: Industrias Techno-Matic S.A., Barcelona, Spain

[21] Appl. No.: 783,616

[22] Filed: Oct. 25, 1991

Related U.S. Application Data

[63] Continuation of Ser. No. 529,909, May 29, 1990, abandoned.

[30] Foreign Application Priority Data

Jun. 5, 1989 [ES] Spain .................................. 8901819

[51] Int. Cl.$^5$ .............................................. B60J 3/02
[52] U.S. Cl. .................................. 296/97.9; 296/97.12
[58] Field of Search .................. 296/97.9, 97.1, 97.12; 160/307.2, DIG. 3

[56] References Cited

U.S. PATENT DOCUMENTS

| | | |
|---|---|---|
| 2,844,406 | 7/1958 | Herr et al. |
| 4,352,518 | 10/1982 | Prince et al. |
| 4,390,202 | 6/1983 | Flowerday et al. |
| 4,600,234 | 7/1986 | Jonsas |
| 4,610,477 | 9/1986 | Ebert et al. |
| 4,620,742 | 11/1986 | Gavagan |
| 4,702,513 | 10/1987 | Ebert et al. |
| 4,707,019 | 11/1987 | Ebert et al. |
| 4,711,483 | 12/1987 | Gulette et al. |
| 4,773,699 | 9/1988 | Cebollero ........................ 296/97.1 |
| 4,821,374 | 4/1989 | Gavagan |
| 4,822,095 | 4/1989 | Svensson ........................ 296/97.1 |
| 4,828,313 | 5/1989 | Lanser et al. ................ 296/97.1 X |
| 5,011,211 | 4/1991 | Svensson ........................ 296/97.1 |

FOREIGN PATENT DOCUMENTS

| | | | |
|---|---|---|---|
| 76174 | 4/1983 | European Pat. Off. | 296/97.1 |
| 275903 | 7/1988 | European Pat. Off. | 296/97.12 |
| 340195 | 11/1989 | European Pat. Off. | 296/97.12 |
| 1252082 | 10/1967 | Fed. Rep. of Germany | 296/97.9 |
| 2226429 | 12/1973 | Fed. Rep. of Germany | 296/97.9 |
| 3601761 | 4/1987 | Fed. Rep. of Germany | 296/97.1 |
| 1396360 | 3/1965 | France | 296/97.9 |
| 26323 | 2/1984 | Japan | 296/97.9 |
| 921548 | 3/1963 | United Kingdom | 296/97.9 |
| 1043087 | 9/1966 | United Kingdom | 296/97.9 |
| 1200017 | 8/1970 | United Kingdom | 296/97.9 |
| 1214327 | 12/1970 | United Kingdom | 296/97.1 |
| 2187424 | 9/1987 | United Kingdom | 296/97.9 |

Primary Examiner—Margaret A. Focarino
Assistant Examiner—Joseph D. Pape
Attorney, Agent, or Firm—Michael J. Striker

[57] ABSTRACT

A sun visor for automobiles which comprises a stiff plastic hollow base structure and two stiff plastic end members secured, respectively, at two opposite ends of a longitudinal edge of the base structure. One of the two end members has a cavity for receiving a pin that supports the sun visor in an automobile roof with a spring located in the cavity. The other of the two stiff plastic end members comprises an attachment extension to be received in an appropriate part in the automobile roof.

2 Claims, 1 Drawing Sheet

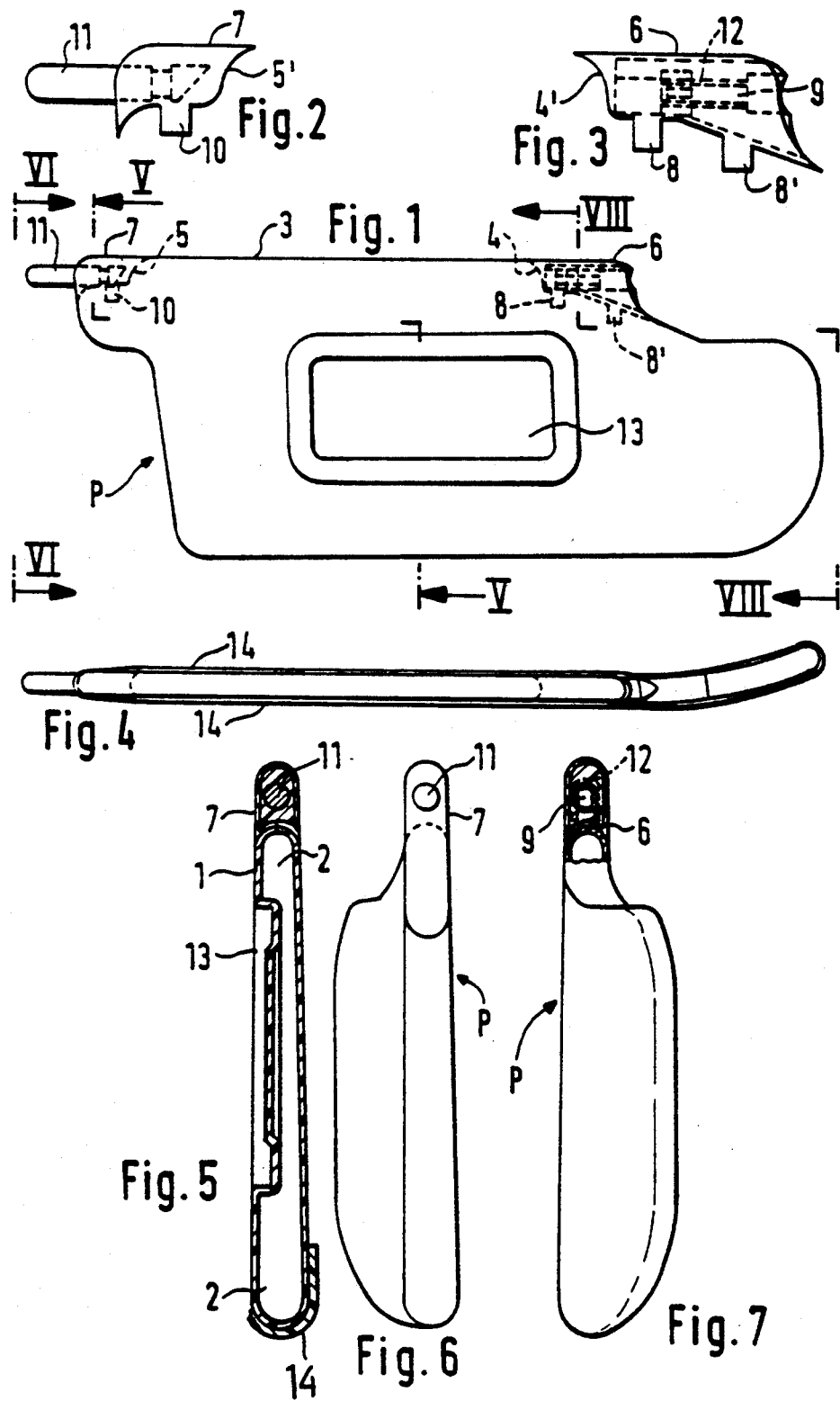

SUN VISOR FOR AUTOMOBILES

This is a continuation of application Ser. No. 07/529,909, filed May 29, 1990, now abandoned.

BACKGROUND OF THE INVENTION

The present invention relates to sun visors for automobiles. Sun visors for automobiles are well known and widely used. However, the conventional sun visors are relatively heavy, and their manufacture is somewhat complicated.

SUMMARY OF THE INVENTION

The object of the invention is a lightweight sun visor for an automobile whose manufacture is substantially simplified.

The object of the invention is achieved by providing a sun visor comprising a stiff hollow base structure made, preferably, from polyethylene, and having an upper longitudinal edge with specially shaped opposite ends to which two supplementary stiff plastic members are, respectively, coupled. One of the members supports the visor support pin and is provided therefor with an appropriate cavity with an appropriate spring therein. The other member forms an attachment extension. The two members may be made integral with the base structure during manufacture of the latter or, during a subsequent operation, by being glued or, preferably, by being ultrasonically welded to the base structure.

The lightweight sun visor assembly produced as discussed above is sheathed in a flexible PVC sheet. The sun visor according to the invention may, optionally, be fitted with a mirror mounted in a recess provided to this end on one of the sun visor sides.

Providing a hollow base structure permits to avoid filling and subsequent curing operation. Thereby, the manufacturing process is simplified, unit costs as well as manufacturing time and weight are reduced.

The present invention both as to its construction so to its method of operation, together with additional objects and advantages thereof, will be best understood from the following detailed description of specific embodiments when read in connection with the accompanying drawings.

BRIEF DESCRIPTION OF THE DRAWINGS

FIG. 1 shows a front view of a sun visor according to the invention with dotted lines showing locations where elements of the assembly are attached to each other;

FIG. 2 shows an enlarged side view of one of the end members of the sun visor according to the invention;

FIG. 3 shows a view similar to that of FIG. 2 of another one of the end members of the sun visor according to the invention;

FIG. 4 shows a top view of the sun visor according to the invention;

FIG. 5 shows a cross-sectional view of the sun visor according to the invention taken along line V—V in FIG. 1;

FIG. 6 shows a side view of the sun visor according to the invention as seen in direction VI—VI in FIG. 1; and FIG. 7 shows a partially cross-sectional view of the sun visor according to the invention as seen in direction VII—VII in FIG. 1.

DETAILED DESCRIPTION OF THE PREFERRED EMBODIMENT

The sun visor shown in FIG. 1, comprises a base structure 1 made from a blown polyethylene mass having high mechanical and tensile strength, and determining the shape and the volume of the sun visor P. Because the mechanical and tensile strength insure a high stiffness of the base structure, it is possible to make it hollow with a cavity 2a shown in FIG. 2. In the area of the upper longitudinal edge 3 of the base structure, there are provided, at opposite ends of the edge 3, two cavities 4 and 5, respectively, for receiving two supplementary end members 6 and 7, respectively. The members 6 and 7 define a pivot axis of the sun visor. The end member 6 has a contour 4' corresponding to the shape of the cavity 4 and two projections 8 and 8' acting as anchoring pegs. The end member 6 has a recess 9 for receiving a support pin (not shown) with which the sun visor is connected with the vehicle body.

The end 7 has a contour 5' corresponding to the shape of the cavity 5, and projections 10 serving as anchoring pegs. The end member 7 is provided with an extension 11 received in an appropriate hole in the vehicle.

The visor support shaft is located in the end member 6 and is held there due to spring 12. A recess 13 for housing a mirror can be provided in any of the opposite major sides of the base structure. The whole sun visor is wrapped in a sheath made of flexible PVC material and shown partially in FIG. 5. The sheath 14 gives the sun visor a uniform appearance and a pleasing finish.

While the invention has been illustrated and described as embodied in a sun visor for automobiles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A sun visor for automobiles, comprising a single stiff plastic hollow one-piece base structure consisting of a blown polyethylene mass and including a longitudinal edge having opposite ends and cavities formed in said polyethylene mass of said one piece base structure at said opposite ends; and mounting means consisting of a first supplementary stiff plastic end member received in one of said cavities in said polyethylene mass at one of said opposite ends and having a recess for receiving a pin that supports said sun visor in an automobile roof, a spring located in said first supplementary stiff plastic end member, and a second supplementary stiff plastic end member received in the other of said cavities in said polyethylene mass at another one of said opposite ends and comprising an attachment extension to be received in a hole in the automobile roof.

2. A sun visor for automobiles, comprising a single stiff plastic hollow one-piece base structure consisting of a blown polyethylene mass and including a longitudinal edge having opposite ends and cavities formed in said polyethylene mass of said one-piece base structure at said opposite ends; and mounting means consisting of a first supplementary stiff plastic end member received in one of said cavities in said polyethylene mass at one of said opposite ends and having a recess for receiving a pin that supports said sun visor in an automobile roof, a spring located in said first supplementary stiff plastic end member, a second supplementary stiff plastic end member received in the other of said cavities in said polyethylene mass at another one of said opposite ends and comprising an attachment extension to be received in a hole in the automobile roof; and flexible PVC sheet means which covers said one-piece base structure for sheathing said sun visor.

* * * * *